US009187702B2

(12) United States Patent
Zhan et al.

(10) Patent No.: US 9,187,702 B2
(45) Date of Patent: Nov. 17, 2015

(54) HYDROPROCESSING CATALYST AND METHOD OF MAKING THE SAME

(75) Inventors: Bi-Zeng Zhan, Albany, CA (US);
Theodorus Maesen, Point Richmond, CA (US); Janine Lichtenberger, Berkeley, CA (US); Andrew Rainis, Walnut Creek, CA (US); Hye-Kyung Timken, Albany, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 1012 days.

(21) Appl. No.: 12/496,442

(22) Filed: Jul. 1, 2009

(65) Prior Publication Data
US 2011/0000824 A1    Jan. 6, 2011

(51) Int. Cl.
| | |
|---|---|
| *C10G 49/08* | (2006.01) |
| *C10G 47/06* | (2006.01) |
| *C10G 47/12* | (2006.01) |
| *B01J 29/10* | (2006.01) |
| *B01J 21/12* | (2006.01) |
| *B01J 35/10* | (2006.01) |
| *C10G 47/14* | (2006.01) |
| *C10G 49/04* | (2006.01) |
| *C10G 49/06* | (2006.01) |
| *B01J 29/08* | (2006.01) |
| *B01J 29/12* | (2006.01) |
| *B01J 29/14* | (2006.01) |
| *B01J 29/16* | (2006.01) |
| *C10G 45/00* | (2006.01) |
| *C10G 45/04* | (2006.01) |
| *C10G 45/12* | (2006.01) |
| *C10G 45/54* | (2006.01) |
| *B01J 37/02* | (2006.01) |

(52) U.S. Cl.
CPC .............. *C10G 49/08* (2013.01); *B01J 29/084* (2013.01); *B01J 29/106* (2013.01); *B01J 29/126* (2013.01); *B01J 29/146* (2013.01); *B01J 29/166* (2013.01); *C10G 45/00* (2013.01); *C10G 45/04* (2013.01); *C10G 45/12* (2013.01); *C10G 45/54* (2013.01); *C10G 47/06* (2013.01); *C10G 47/12* (2013.01); *C10G 47/14* (2013.01); *C10G 49/04* (2013.01); *C10G 49/06* (2013.01); *B01J 21/12* (2013.01); *B01J 35/1019* (2013.01); *B01J 35/1023* (2013.01); *B01J 35/1042* (2013.01); *B01J 35/1047* (2013.01); *B01J 35/1061* (2013.01); *B01J 37/0203* (2013.01); *B01J 2229/20* (2013.01); *B01J 2229/34* (2013.01); *B01J 2229/42* (2013.01); *C10G 2300/4018* (2013.01); *C10G 2400/04* (2013.01)

(58) Field of Classification Search
USPC ............. 208/111.3, 111.35, 143, 215, 216 R, 208/216 PP, 217, 254 H; 502/63, 78, 167, 502/254, 258
See application file for complete search history.

(56) References Cited

U.S. PATENT DOCUMENTS

| | | | |
|---|---|---|---|
| 1,914,558 A | 6/1933 | Craver | |
| 2,889,287 A | 6/1959 | Scott | |
| 2,927,088 A | 3/1960 | Michalko et al. | |
| 3,147,154 A | 9/1964 | Cole et al. | |
| 3,156,641 A | 11/1964 | Seelig et al. | |
| 3,228,892 A | 1/1966 | Cole et al. | |
| 3,232,887 A | 2/1966 | Pessimisis | |
| 3,409,681 A | 11/1968 | Kroll | |
| 3,553,102 A | 1/1971 | Rosinski et al. | |
| 3,591,649 A | 7/1971 | Kroll et al. | |
| 3,671,597 A | 6/1972 | Kroll | |
| 3,676,330 A | 7/1972 | Plank et al. | |
| 3,697,444 A | 10/1972 | Van Klinken et al. | |
| 3,706,815 A | 12/1972 | Alley | |
| 3,994,832 A * | 11/1976 | Antos ........................... | 502/334 |
| 4,107,087 A | 8/1978 | Pessimisis | |
| 4,483,947 A | 11/1984 | Jakob et al. | |
| 4,568,450 A | 2/1986 | Ting et al. | |
| 4,783,434 A | 11/1988 | Wigman et al. | |
| 4,861,746 A | 8/1989 | Oishi et al. | |
| 5,378,351 A | 1/1995 | Guichard et al. | |
| 6,291,394 B1 * | 9/2001 | Shukis et al. .................. | 502/355 |
| 6,860,986 B2 * | 3/2005 | Timken et al. ........... | 208/111.01 |
| 7,544,632 B2 | 6/2009 | Soled et al. | |
| 7,594,992 B2 | 9/2009 | Timken et al. | |
| 2002/0160911 A1 | 10/2002 | Benazzi et al. | |
| 2005/0261124 A1 * | 11/2005 | Yoshimura et al. ........... | 502/210 |
| 2005/0274646 A1 * | 12/2005 | Lawson et al. .............. | 208/111.3 |
| 2006/0011512 A1 | 1/2006 | Espinoza et al. | |
| 2006/0060503 A1 * | 3/2006 | Soled et al. ................. | 208/111.3 |

FOREIGN PATENT DOCUMENTS

| | | |
|---|---|---|
| CN | 1178238 A | 4/1998 |
| EP | 1041133 A1 | 4/2000 |
| JP | 2003-299960 | 10/2003 |

(Continued)

OTHER PUBLICATIONS

PCT International Search Report and Written Opinion, International Application No. PCT/US2010/040416, dated Feb. 28, 2011.
Van Dillen, Synthesis of supported catalysts by impregnation and drying using aqueous chelated metal complexes, Sep. 16, 2002, Elsevier Science (USA), Journal of Catalysis.
Smulligan-Maldanis, Revised 1-C9UXR Hydrocracking Catalyst FTO Research, Report No. 11004497-2, Oct. 8, 2009, Nerac, Inc.
Shuangqin Zeng et al., "Mesoporous Materials From Zeolite Seeds as Supports for Nickel Tungsten Sulfide Active Phases, Part 1, Characterization and Catalytic Properties in Hydrocracking Reactions," Applied Catalysis A: General, 294:59-67 (Jul. 17, 2005), XP002690050.

*Primary Examiner* — Renee E Robinson
(74) *Attorney, Agent, or Firm* — Michael D. Ross

(57) ABSTRACT

The present invention is directed to a hydroprocessing catalyst containing at least one catalyst support, one or more metals, optionally one or more molecular sieves, optionally one or more promoters, wherein deposition of at least one of the metals is achieved in the presence of a modifying agent.

12 Claims, 1 Drawing Sheet

(56) References Cited

FOREIGN PATENT DOCUMENTS

| | | |
|---|---|---|
| JP | 2005262212 A | 9/2005 |
| JP | 2007-526119 | 9/2007 |
| JP | 2006-505676 | 6/2015 |
| WO | WO9804345 A1 | 2/1998 |
| WO | WO2004/054712 | 7/2004 |
| WO | WO2007103027 A1 | 9/2007 |

OTHER PUBLICATIONS

M.A. Ali et al., "Development of Heavy Oil Hydrocracking Catalysts Using Amorphous Silica Alumina and Zeolites as Catalyst Supports", Applied Catalysis A: General, 233:77-90 (Dec. 31, 2002), XP002690053.

Extended European Search Report dated Jan. 25, 2013 issued in the corresponding European Application No. EP 10794645, 6 pages.

First Third Party Observation filed in Japanese Patent Office on Aug. 5, 2014 in corresponding Japanese application No. 2012-517858.

Annex 1 of First Third Party Observation filed in Japanese Patent Office on Aug. 5, 2014 in corresponding Japanese application No. 2012-517858.

Annex 2 of First Third Party Observation filed in Japanese Patent Office on Aug. 5, 2014 in corresponding Japanese application No. 2012-517858.

Annex 3 of First Third Party Observation filed in Japanese Patent Office on Aug. 5, 2014 in corresponding Japanese application No. 2012-517858.

Annex 4 of First Third Party Observation filed in Japanese Patent Office on Aug. 5, 2014 in corresponding Japanese application No. 2012-517858.

Yoshio Ono and Tateak; Yashima, "Science and Engineering of Zeolite", Kodansha Ltd., Aug. 10, 2002, pp. 99-100 and 103-104.

Dr. Powder, "Easy Powder Lecture—Comparison of Mercury Intrusion Method with Gas Absorption Method", Shimadzu Corporation, [Internet Search on Jul. 3, 2014].

Dr. Powder, "Easy Powder Lecture—Mercury Intrusion Method-Contact Angle and Surface Tension", Shimadzu Corporation, [Internet Search on Jul. 3, 2014].

"Catalyst Lecture 5. (Engineering Edition 1) Catalyst: Design", Kodansha Ltd., Dec. 10, 1985, p. 122.

"Material Safety Data Sheet DL-Malic Acid", Kishida Chemical Co., Ltd., Aug. 24, 2005.

"Silica-Aluminas", Germany, Sasol Germany GmbH, [Internet search on Jul. 18, 2014).

"Y-Type Zeolite (HSZ-300 Series)", Tosoh Corporation. [Internet Search on Jul. 18, 2014].

Second Third Party Observation submitted in corresponding Japanese application No. 2012-517858 dated Aug. 22, 2014.

Annex 1 for Second Third Party Observation submitted in corresponding Japanese application No. 2012-517858 dated Aug. 22, 2014.

Annex 2 for Second Third Party Observation submitted in corresponding Japanese application No. 2012-517858 dated Aug. 22, 2014.

Annex 3 for Second Third Party Observation submitted in corresponding Japanese application No. 2012-517858 dated Aug. 22, 2014.

Annex 4 for Second Third Party Observation submitted in corresponding Japanese application No. 2012-517858 dated Aug. 22, 2014.

Annex 5 for Second Third Party Observation submitted in corresponding Japanese application No. 2012-517858 dated Aug. 22, 2014.

Annex 6 for Second Third Party Observation submitted in corresponding Japanese application No. 2012-517858 dated Aug. 22, 2014.

Yoshio Ono and Tateaki Yashima, "Science and Engineering of Zeolite", Kodansha Ltd., Aug. 10, 2002, pp. 99-100 and 103-104.

"Material Safety Data Sheet Citric Acid Monohydrate", Showa Chemical Co. Ltd., Aug. 4, 2010.

* cited by examiner

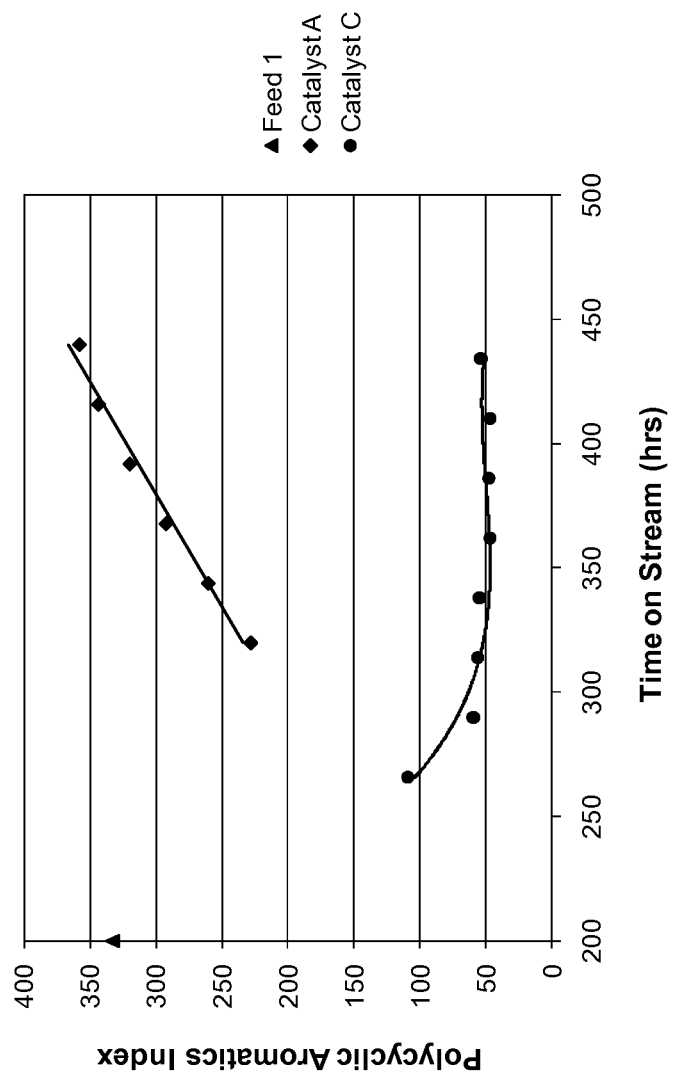

US 9,187,702 B2

HYDROPROCESSING CATALYST AND METHOD OF MAKING THE SAME

FIELD OF THE INVENTION

The present invention is directed to a catalyst for hydroprocessing a carbonaceous feedstock under hydroprocessing conditions, methods for making the catalyst, and hydroprocessing processes using the catalyst of the present invention.

BACKGROUND OF THE INVENTION

Catalytic hydroprocessing refers to petroleum refining processes in which a carbonaceous feedstock is brought into contact with hydrogen and a catalyst, at a higher temperature and pressure, for the purpose of removing undesirable impurities and/or converting the feedstock to an improved product. Examples of hydroprocessing processes include hydrotreating, hydrodemetalization, hydrocracking and hydroisomerization processes.

A hydroprocessing catalyst typically consists of one or more metals deposited on a support or carrier consisting of an amorphous oxide and/or a crystalline microporous material (e.g. a zeolite). The selection of the support and metals depend upon the particular hydroprocessing process for which the catalyst is employed.

Petroleum refiners continue to seek out catalysts of improved activity, selectivity and/or stability. Increasing the activity of a catalyst increases the rate at which a chemical reaction proceeds under a given set of conditions, increasing the selectivity of the catalysts decreases unwanted by-products of the reaction, and increasing the stability of a catalyst increases its resistance to deactivation, that is, the useful life of the catalyst is extended. In general, as the activity of the catalyst is increased, the conditions required to produce a given end product, such as a hydrocarbon of a particular sulfur or nitrogen content, becomes more mild (e.g. decreased temperature). Milder conditions require less energy to achieve a desired product, and the catalyst's life is extended due to such factors as lower coke formation and the like.

It is well known in the art that modest or slight variations in compositional characteristics or methods of preparing hydroprocessing catalysts have been known to have highly unpredictable activity, selectivity and/or stability effects on hydroprocessing reactions (such as denitrogenation and/or desulfurization reactions). Accordingly, because of this unpredictability in the art, there continues to be new and surprising improvements in activity, selectivity and/or stability of hydroprocessing catalysts.

SUMMARY OF THE INVENTION

The present invention is directed to a hydroprocessing catalyst containing at least one catalyst support, one or more metals, optionally one or more molecular sieves, and optionally one or more promoters, wherein deposition of at least one of the metals is achieved in the presence of a modifying agent.

The present invention is also directed to methods for making the catalyst, and hydroprocessing processes using the catalyst of the present invention.

BRIEF DESCRIPTION OF THE DRAWINGS

FIG. 1 shows the polycyclic aromatics build up as a function of time-on-stream for the catalyst compositions synthesized per the teachings of Examples 1 and 3 herein.

DETAILED DESCRIPTION OF THE INVENTION

Introduction

The term "Periodic Table" refers to the version of IUPAC Periodic Table of the Elements dated Jun. 22, 2007, and the numbering scheme for the Periodic Table Groups is as described in Chemical and Engineering News, 63(5), 27 (1985).

The term "bulk dry weight" to the weight of a material after calcination at elevated temperature of over 1000° C. for 30 minutes.

The term "hydroprocessing" refers to a process in which a carbonaceous feedstock is brought into contact with hydrogen and a catalyst, at a higher temperature and pressure, for the purpose of removing undesirable impurities and/or converting the feedstock to a desired product.

The term "hydrotreating" refers to a process that converts sulfur- and/or nitrogen-containing hydrocarbon feeds into hydrocarbon products with reduced sulfur and/or nitrogen content, typically in conjunction with a hydrocracking function, and which generates hydrogen sulfide and/or ammonia (respectively) as byproducts.

The term "hydrocracking" refers to a process in which hydrogenation and dehydrogenation accompanies the cracking/fragmentation of hydrocarbons, e.g., converting heavier hydrocarbons into lighter hydrocarbons, or converting aromatics and/or cycloparaffins (naphthenes) into non-cyclic branched paraffins.

The term "hydroisomerization" refers to a process in which normal paraffins are isomerized to their more branched counterparts in the presence of hydrogen over a catalyst.

The term "hydrodemetalization" refers to a process that removes undesirable metals from hydrocarbon feeds into hydrocarbon products with reduced metal content.

The term "gas-to-liquid" (GTL) refers to a process in which gas-phase hydrocarbons such as natural gas are converted to longer-chain hydrocarbons such as diesel fuel via direct conversion or via syngas as an intermediate, for example using the Fischer-Tropsch process.

The term "framework topology" and its preceding three-letter framework code refers to the Framework Type data provided for the framework code in "Atlas of Zeolite Types" $6^{th}$ Edition, 2007.

The term "alkenyl," as used herein, represents a straight or branched chain group of one to twelve carbon atoms derived from a straight or branched chain hydrocarbon containing at least one carbon-carbon double bond.

The term "hydroxyalkyl," as used herein, represents one or more hydroxyl groups attached to the parent molecular moiety through an alkyl group.

The term "alkoxyalkyl," as used herein, represents one or more alkoxy groups attached to the parent molecular moiety through an alkyl group.

The term "aminoalkyl," as used herein, represents one or more amino groups attached to the parent molecular moiety through an alkyl group.

The term "oxoalkyl," as used herein, represents one or more ether groups attached to the parent molecular moiety through an alkyl group.

The term "carboxyalkyl," as used herein, represents one or more carboxyl groups attached to the parent molecular moiety through an alkyl group.

The term "aminocarboxyalkyl," as used herein, represents one or more carboxyl groups and one or more amino groups attached to the parent molecular moiety through an alkyl group.

The term "hydroxycarboxyalkyl," as used herein, represents one or more carboxyl groups and one or more hydroxyl groups attached to the parent molecular moiety through an alkyl group.

Where permitted, all publications, patents and patent applications cited in this application are herein incorporated by reference in their entirety; to the extent such disclosure is not inconsistent with the present invention.

Unless otherwise specified, the recitation of a genus of elements, materials or other components, from which an individual component or mixture of components can be selected, is intended to include all possible sub-generic combinations of the listed components and mixtures thereof. Also, "include" and its variants are intended to be non-limiting, such that recitation of items in a list is not to the exclusion of other like items that may also be useful in the materials, compositions and methods of this invention.

Properties for the materials described herein are determined as follows:

(a) Constrained index (CI): indicates the total cracking conversion of a 50/50 mixture of n-hexane and 3-methylpentane by a sample catalyst at 900° F. (482° C.), 0.68 WHSV. Samples are prepared according to the method described in U.S. Pat. No. 7,063,828 to Zones and Burton, issued Jun. 20, 2006.

(b) Brønsted acidity: determined by isopropylamine-temperature-programmed desorption (IPam TPD) adapted from the published descriptions by T. J. Gricus Kofke, R. K. Gorte, W. E. Farneth, J. Catal. 114, 34-45, 1988; T. J. Gricus Kifke, R. J. Gorte, G. T. Kokotailo, J. Catal. 115, 265-272, 1989; J. G. Tittensor, R. J. Gorte and D. M. Chapman, J. Catal. 138, 714-720, 1992.

(c) $SiO_2/Al_2O_3$ Ratio (SAR): determined by ICP elemental analysis. A SAR of infinity ($\infty$) represents the case where there is no aluminum in the zeolite, i.e., the mole ratio of silica to alumina is infinity. In that case the molecular sieve is comprised of essentially all of silica.

(d) Surface area: determined by $N_2$ adsorption at its boiling temperature. BET surface area is calculated by the 5-point method at $P/P_0$=0.050, 0.088, 0.125, 0.163, and 0.200. Samples are first pre-treated at 400° C. for 6 hours in the presence of flowing, dry $N_2$ so as to eliminate any adsorbed volatiles like water or organics.

(e) Micropore volume: determined by $N_2$ adsorption at its boiling temperature. Micropore volume is calculated by the t-plot method at $P/P_0$=0.050, 0.088, 0.125, 0.163, and 0.200. Samples are first pre-treated at 400° C. for 6 hours in the presence of flowing, dry $N_2$ so as to eliminate any adsorbed volatiles like water or organics.

(f) Mesopore pore diameter: determined by $N_2$ adsorption at its boiling temperature. Mesopore pore diameter is calculated from $N_2$ isotherms by the BJH method described in E. P. Barrett, L. G. Joyner and P. P. Halenda, "The determination of pore volume and area distributions in porous substances. I. Computations from nitrogen isotherms." J. Am. Chem. Soc. 73, 373-380, 1951. Samples are first pre-treated at 400° C. for 6 hours in the presence of flowing, dry $N_2$ so as to eliminate any adsorbed volatiles like water or organics.

(g) Total pore volume: determined by $N_2$ adsorption at its boiling temperature at $P/P_0$=0.990. Samples are first pre-treated at 400° C. for 6 hours in the presence of flowing, dry $N_2$ so as to eliminate any adsorbed volatiles like water or organics.

(h) Unit cell size: determined by X-ray powder diffraction.

(i) Alpha value: determined by an Alpha test adapted from the published descriptions of the Mobil Alpha test (P. B. Weisz and J. N. Miale, J. Catal., 4, 527-529, 1965; J. N. Miale, N. Y. Chen, and P. B. Weisz, J. Catal., 6, 278-87, 1966). The "Alpha Value" is calculated as the cracking rate of the sample in question divided by the cracking rate of a standard silica alumina sample. The resulting "Alpha" is a measure of acid cracking activity which generally correlates with number of acid sites.

Hydroprocessing Catalyst Composition

The present invention is directed to a hydroprocessing catalyst containing at least one catalyst support, one or more metals, optionally one or more molecular sieves, and optionally one or more promoters, wherein deposition of at least one of the metals is achieved in the presence of a modifying agent.

For each embodiment described herein, the catalyst support is selected from the group consisting of alumina, silica, zirconia, titanium oxide, magnesium oxide, thorium oxide, beryllium oxide, alumina-silica, alumina-titanium oxide, alumina-magnesium oxide, silica-magnesium oxide, silica-zirconia, silica-thorium oxide, silica-beryllium oxide, silica-titanium oxide, titanium oxide-zirconia, silica-alumina-zirconia, silica-alumina-thorium oxide, silica-alumina-titanium oxide or silica-alumina-magnesium oxide, preferably alumina, silica-alumina, and combinations thereof.

In one subembodiment, the catalyst support is an alumina selected from the group consisting of γ-alumina, η-alumina, θ-alumina, δ-alumina, χ-alumina, and mixtures thereof.

In another subembodiment, the catalyst support is an amorphous silica-alumina material in which the mean mesopore diameter is between 70 Å and 130 Å.

In another subembodiment, the catalyst support is an amorphous silica-alumina material containing $SiO_2$ in an amount of 10 to 70 wt. % of the bulk dry weight of the carrier as determined by ICP elemental analysis, a BET surface area of between 450 and 550 $m^2/g$ and a total pore volume of between 0.75 and 1.05 mL/g.

In another subembodiment, the catalyst support is an amorphous silica-alumina material containing $SiO_2$ in an amount of 10 to 70 wt. % of the bulk dry weight of the carrier as determined by ICP elemental analysis, a BET surface area of between 450 and 550 $m^2/g$, a total pore volume of between 0.75 and 1.05 mL/g, and a mean mesopore diameter is between 70 Å and 130 Å.

In another subembodiment, the catalyst support is a highly homogeneous amorphous silica-alumina material having a surface to bulk silica to alumina ratio (S/B ratio) of 0.7 to 1.3, and a crystalline alumina phase present in an amount no more than about 10 wt. %.

$$S/B \text{ Ratio} = \frac{(Si/Al \text{ atomic ratio of the surface measured by } XPS)}{\left(\begin{array}{c} Si/Al \text{ atomic ratio of the} \\ \text{bulk measured by elemental analysis} \end{array}\right)}$$

To determine the S/B ratio, the Si/Al atomic ratio of the silica-alumina surface is measured using x-ray photoelectron spectroscopy (XPS). XPS is also known as electron spectroscopy for chemical analysis (ESCA). Since the penetration depth of XPS is less than 50 Å, the Si/Al atomic ratio measured by XPS is for the surface chemical composition.

Use of XPS for silica-alumina characterization was published by W. Daneiell et al. in Applied Catalysis A, 196, 247-260, 2000. The XPS technique is, therefore, effective in measuring the chemical composition of the outer layer of catalytic particle surface. Other surface measurement techniques, such as Auger electron spectroscopy (AES) and Secondary-ion mass spectroscopy (SIMS), could also be used for measurement of the surface composition.

Separately, the bulk Si/Al ratio of the composition is determined from ICP elemental analysis. Then, by comparing the surface Si/Al ratio to the bulk Si/Al ratio, the S/B ratio and the homogeneity of silica-alumina are determined. How the SB ratio defines the homogeneity of a particle is explained as follows. An S/B ratio of 1.0 means the material is completely homogeneous throughout the particles. An S/B ratio of less than 1.0 means the particle surface is enriched with aluminum (or depleted with silicon), and aluminum is predominantly located on the external surface of the particles. The S/B ratio of more than 1.0 means the particle surface is enriched with silicon (or depleted with aluminum), and aluminum is predominantly located on the internal area of the particles.

For each embodiment described herein, the amount of catalyst support in the hydroprocessing catalyst is from 5 wt. % to 80 wt. % based on the bulk dry weight of the hydroprocessing catalyst.

For each embodiment described herein, the hydroprocessing catalyst may optionally contain one or more molecular sieves selected from the group consisting of BEA-, ISV-, BEC-, IWR-, MTW-, *STO-, OFF-, MAZ-, MOR-, MOZ-, AFI-, *NRE-, SSY-, FAU-, EMT-, ITQ-21-, ERT-, ITQ-33-, and ITQ-37-type molecular sieves, and mixtures thereof.

In one subembodiment, the one or more molecular sieves selected from the group consisting of molecular sieves having a FAU framework topology, molecular sieves having a BEA framework topology, and mixtures thereof.

The amount of molecular sieve material in the hydroprocessing catalyst is from 0 wt. % to 60 wt. % based on the bulk dry weight of the hydroprocessing catalyst. In one subembodiment, the amount of molecular sieve material in the hydroprocessing catalyst is from 0.5 wt. % to 40% wt. %.

In one subembodiment, the molecular sieve is a Y zeolite with a unit cell size of 24.15 Å-24.45 Å. In another subembodiment, the molecular sieve is a Y zeolite with a unit cell size of 24.15 Å-24.35 Å. In another subembodiment, the molecular sieve is a low-acidity, highly dealuminated ultrastable Y zeolite having an Alpha value of less than 5 and a Brønsted acidity of from 1 to 40. In one subembodiment, the molecular sieve is a Y zeolite having the properties described in Table 1 below.

TABLE 1

| Alpha value | 0.01-5 |
| CI | 0.05-5% |
| Brønsted acidity | 1-40 μmole/g |
| SAR | 80-150 |
| surface area | 650-750 m$^2$/g |
| micropore volume | 0.25-0.30 mL/g |
| total pore volume | 0.51-0.55 mL/g |
| unit cell size | 24.15-24.35 Å |

In another subembodiment, the molecular sieve is a Y zeolite having the properties described in Table 2 below.

TABLE 2

| SAR | 10-∞ |
| micropore volume | 0.15-0.27 mL/g |
| BET surface area | 700-825 m$^2$/g |
| unit cell size | 24.15-24.45 Å |

In another subembodiment, the catalyst contains from 0.1 wt. % to 40 wt. % (based on the bulk dry weight of the catalyst) of a Y zeolite having the properties described Table 2 above, and from 1 wt. % to 60 wt. % (based on the bulk dry weight of the catalyst) of a low-acidity, highly dealuminated ultrastable Y zeolite having an Alpha value of less than about 5 and Brønsted acidity of from 1 to 40 micro-mole/g.

As described herein above, the hydroprocessing catalyst of the present invention contains one or more metals. For each embodiment described herein, each metal employed is selected from the group consisting of elements from Group 6 and Groups 8 through 10 of the Periodic Table, and mixtures thereof. In one subembodiment, each metal is selected from the group consisting of nickel (Ni), palladium (Pd), platinum (Pt), cobalt (Co), iron (Fe), chromium (Cr), molybdenum (Mo), tungsten (W), and mixtures thereof. In another subembodiment, the hydroprocessing catalyst contains at least one Group 6 metal and at least one metal selected from Groups 8 through 10 of the periodic table. Exemplary metal combinations include Ni/Mo/W, Ni/Mo, Ni/W, Co/Mo, Co/W, Co/W/Mo and Ni/Co/W/Mo.

The total amount of metal oxide material in the hydroprocessing catalyst is from 0.1 wt. % to 90 wt. % based on the bulk dry weight of the hydroprocessing catalyst. In one subembodiment, the hydroprocessing catalyst contains from 2 wt. % to 10 wt. % of nickel oxide and from 8 wt. % to 40 wt. % of tungsten oxide based on the bulk dry weight of the hydroprocessing catalyst.

A diluent may be employed in the formation of the hydroprocessing catalyst. Suitable diluents include inorganic oxides such as aluminum oxide and silicon oxide, titanium oxide, clays, ceria, and zirconia, and mixture of thereof. The amount of diluent in the hydroprocessing catalyst is from 0 wt. % to 35 wt. % based on the bulk dry weight of the hydroprocessing catalyst. In one subembodiment, the amount of diluent in the hydroprocessing catalyst is from 0.1 wt. % to 25 wt. % based on the bulk dry weight of the hydroprocessing catalyst.

The hydroprocessing catalyst of the present invention may contain one or more promoters selected from the group consisting of phosphorous (P), boron (B), fluorine (F), silicon (Si), aluminum (Al), zinc (Zn), manganese (Mn), and mixtures thereof. The amount of promoter in the hydroprocessing catalyst is from 0 wt. % to 10 wt. % based on the bulk dry weight of the hydroprocessing catalyst. In one subembodiment, the amount of promoter in the hydroprocessing catalyst is from 0.1 wt. % to 5 wt. % based on the bulk dry weight of the hydroprocessing catalyst.

Preparation of the Hydroprocessing Catalyst

In the present invention, deposition of at least one of the metals on the catalyst is achieved in the presence of a modifying agent. In one embodiment, a shaped hydroprocessing catalyst is prepared by:

(a) forming an extrudable mass containing at least the amorphous silica-alumina catalyst support, (b) extruding then calcining the mass to form a calcined extrudate, (c) exposing the calcined extrudate to an impregnation solution containing at least one metal and a modifying agent to form an impregnated extrudate, and (d) drying the impregnated extrudate at a temperature below the decomposition temperature of the modifying agent and sufficient to remove the impregnation solution solvent, to form a dried impregnated extrudate.

The diluent, promoter and/or molecular sieve (if employed) may be combined with the carrier when forming the extrudable mass. In another embodiment, the carrier and (optionally) the diluent, promoter and/or molecular sieve can be impregnated before or after being formed into the desired shapes.

In one embodiment, deposition of at least one of the metals is achieved in the presence of a modifying agent is selected from the group consisting of compounds represented by structures (1) through (4), including condensated forms thereof:

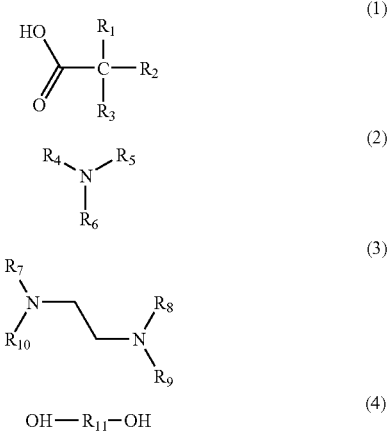

(1)

(2)

(3)

(4)

wherein:

(1) $R_1$, $R_2$ and $R_3$ are independently selected from the group consisting of hydrogen; hydroxyl; methyl; amine; and linear or branched, substituted or unsubstituted $C_1$-$C_3$ alkyl groups, $C_1$-$C_3$ alkenyl groups, $C_1$-$C_3$ hydroxyalkyl groups, $C_1$-$C_3$ alkoxyalkyl groups, $C_1$-$C_3$ aminoalkyl groups, $C_1$-$C_3$ oxoalkyl groups, $C_1$-$C_3$ carboxyalkyl groups, $C_1$-$C_3$ aminocarboxyalkyl groups and $C_1$-$C_3$ hydroxycarboxyalkyl groups;

(2) $R_4$ through $R_{10}$ are independently selected from the group consisting of hydrogen; hydroxyl; and linear or branched, substituted or unsubstituted $C_2$-$C_3$ carboxyalkyl groups; and (3) $R_{11}$ is selected from the group consisting of linear or branched, saturated and unsaturated, substituted or unsubstituted $C_1$-$C_3$ alkyl groups, $C_1$-$C_3$ hydroxyalkyl groups, and $C_1$-$C_3$ oxoalkyl groups.

Representative examples of modifying agents useful in this embodiment include 2,3-dihydroxy-succinic acid, ethanedioic acid, 2-hydroxyacetic acid, 2-hydroxy-propanoic acid, 2-hydroxy-1,2,3-propanetricarboxylic acid, methoxyacetic acid, cis-1,2-ethylene dicarboxylic acid, hydroethane-1,2-dicarboxyic acid, ethane-1,2-diol, propane-1,2,3-triol, propanedioic acid, and α-hydro-ω-hydroxypoly(oxyethylene).

In an alternate embodiment, deposition of at least one of the metals is achieved in the presence of a modifying agent selected from the group consisting of N,N'-bis(2-aminoethyl)-1,2-ethane-diamine, 2-amino-3-(1H-indol-3-yl)-propanoic acid, benzaldehyde, [[(carboxymethyl)imino]bis(ethylenenitrilo)]-tetra-acetic acid, 1,2-cyclohexanediamine, 2-hydroxybenzoic acid, thiocyanate, thiosulfate, thiourea, pyridine, and quinoline.

The modifying agent impedes metal aggregation, thereby enhancing the activity and selectivity of the catalyst.

For each embodiment described herein, the amount of modifying agent in the pre-calcined hydroprocessing catalyst is from 2 wt. % to 18 wt. % based on the bulk dry weight of the hydroprocessing catalyst.

The calcination of the extruded mass will vary depending on the particular support selected. Typically, the extruded mass can be calcined at a temperature between 752° F. (400° C.) and 1200° F. (650° C.) for a period of between 1 and 3 hours.

Non-limiting examples of suitable solvents include water and $C_1$ to $C_3$ alcohols. Other suitable solvents can include polar solvents such as alcohols, ethers, and amines. Water is a preferred solvent. It is also preferred that the metal compounds be water soluble and that a solution of each be formed, or a single solution containing both metals be formed. The modifying agent can be prepared in a suitable solvent, preferably water. The three solvent components can be mixed in any sequence. That is, all three can be blended together at the same time, or they can be sequentially mixed in any order. In an embodiment, it is preferred to first mix the one or more metal components in an aqueous media, than add the modifying agent.

The amount of metal precursors and modifying agent in the impregnation solution should be selected to achieve preferred ratios of metal to modifying agent in the catalyst precursor after drying.

The calcined extrudate is exposed to the impregnation solution until incipient wetness is achieved, typically for a period of between 1 and 100 hours (more typically between 1 and 5 hours) at room temperature to 212° F. (100° C.) while tumbling the extrudates, following by aging for from 0.1 to 10 hours, typically from about 0.5 to about 5 hours.

The drying step is conducted at a temperature sufficient to remove the impregnation solution solvent, but below the decomposition temperature of the modifying agent. In another embodiment, the dried impregnated extrudate is then calcined at a temperature above the decomposition temperature of the modifying agent, typically from about 500° F. (260° C.) to 1100° F. (590° C.), for an effective amount of time, to convert the metals to metal oxides. The present invention contemplates that when the impregnated extrudate is to be calcined, it will undergo drying during the period where the temperature is being elevated or ramped to the intended calcination temperature. This effective amount of time will range from about 0.5 to about 24 hours, typically from about 1 to about 5 hours. The calcination can be carried out in the presence of a flowing oxygen-containing gas such as air, a flowing inert gas such as nitrogen, or a combination of oxygen-containing and inert gases.

The dried and calcined hydroprocessing catalysts of the present invention can be sulfided to form an active catalyst. Sulfiding of the catalyst precursor to form the catalyst can be performed prior to introduction of the catalyst into a reactor (thus ex-situ presulfiding), or can be carried out in the reactor (in-situ sulfiding).

Suitable sulfiding agents include elemental sulfur, ammonium sulfide, ammonium polysulfide ($[(NH_4)_2S_x]$), ammonium thiosulfate (($NH_4)_2S_2O_3$), sodium thiosulfate ($Na_2S_2O_3$), thiourea $CSN_2H_4$, carbon disulfide, dimethyl disulfide (DMDS), dimethyl sulfide (DMS), dibutyl polysulfide (DBPS), mercaptanes, tertiarybutyl polysulfide (PSTB), tertiarynonyl polysulfide (PSTN), aqueous ammonium sulfide.

Generally, the sulfiding agent is present in an amount in excess of the stoichiometric amount required to form the sulfided catalyst. In another embodiment, the amount of sulfiding agent represents a sulphur to metal mole ratio of at least 3 to 1 to produce a sulfided catalyst.

The catalyst is converted into an active sulfided catalyst upon contact with the sulfiding agent at a temperature of 150° F. to 900° F. (66° C. to 482° C.), from 10 minutes to 15 days, and under a $H_2$-containing gas pressure of 101 kPa to 25,000 kPa. If the sulfidation temperature is below the boiling point of the sulfiding agent, the process is generally carried out at atmospheric pressure. Above the boiling temperature of the sulfiding agent/optional components, the reaction is generally carried out at an increased pressure. As used herein, completion of the sulfidation process means that at least 95% of stoichiometric sulfur quantity necessary to convert the metals into for example, $Co_9S_8$, $MoS_2$, $WS_2$, $Ni_3S_2$, etc., has been consumed.

In one embodiment, the sulfiding can be carried out to completion in the gaseous phase with hydrogen and a sulfur-containing compound which is decomposable into $H_2S$. Examples include mercaptanes, $CS_2$, thiophenes, DMS, DMDS and suitable S-containing refinery outlet gasses. The gaseous mixture of $H_2$ and sulfur containing compound can be the same or different in the steps. The sulfidation in the gaseous phase can be done in any suitable manner, including a fixed bed process and a moving bed process (in which the catalyst moves relative to the reactor, e.g., ebullated process and rotary furnace).

The contacting between the catalyst precursor with hydrogen and a sulfur-containing compound can be done in one step at a temperature of 68° F. to 700° F. (20° C. to 371° C.) at a pressure of 101 kPa to 25,000 kPa for a period of 1 to 100 hrs. Typically, sulfidation is carried out over a period of time with the temperature being increased or ramped in increments and held over a period of time until completion.

In another embodiment of sulfidation in the gaseous phase, the sulfidation is done in two or more steps, with the first step being at a lower temperature than the subsequent step(s).

In one embodiment, the sulfidation is carried out in the liquid phase. At first, the catalyst precursor is brought in contact with an organic liquid in an amount in the range of 20% to 500% of the catalyst total pore volume. The contacting with the organic liquid can be at a temperature ranging from ambient to 248° F. (120° C.). After the incorporation of an organic liquid, the catalyst precursor is brought into contact with hydrogen and a sulfur-containing compound.

In one embodiment, the organic liquid has a boiling range of 200° F. to 1200° F. (93° C. to 649° C.). Exemplary organic liquids include petroleum fractions such as heavy oils, lubricating oil fractions like mineral lube oil, atmospheric gas oils, vacuum gas oils, straight run gas oils, white spirit, middle distillates like diesel, jet fuel and heating oil, naphthas, and gasoline. In one embodiment, the organic liquid contains less than 10 wt. % sulfur, and preferably less than 5 wt. %.

Hydroprocessing Processes and Feeds

The catalyst composition according to the invention can be used in the dry or calcined form, in virtually all hydroprocessing processes to treat a plurality of feeds under wide-ranging reaction conditions, e.g., at temperatures in the range of 200° to 450° C., hydrogen pressures in the range of 5 to 300 bar, and space velocities (LHSV) in the range of 0.05 to 10 $h^{-1}$. The hydroprocessing catalyst composition of the invention is particularly suitable for hydrotreating hydrocarbon feedstocks such as middle distillates, kero, naphtha, vacuum gas oils, and heavy gas oils.

Using the catalyst of the present invention, heavy petroleum residual feedstocks, cyclic stocks and other hydrocrackate charge stocks can be hydrocracked using the process conditions and catalyst components disclosed in U.S. Pat. No. 4,910,006 and U.S. Pat. No. 5,316,753. Typically, hydrocracking can be carried out using the catalyst of the present invention by contacting the feedstock with hydrogen and the catalyst at a temperature in the range of 175-485° C., hydrogen pressures in the range of 5 to 300 bar, and LHSV in the range of 0.1-30 $h^{-1}$.

During hydrotreatment, oxygen, sulfur and nitrogen present in the hydrocarbonaceous feed is reduced to low levels. Aromatics and olefins, if present in the feed, may also have their double bonds saturated. In some cases, the hydrotreating catalyst and hydrotreating conditions are selected to minimize cracking reactions, which can reduce the yield of the most desulfided product (typically useful as a fuel).

Hydrotreating conditions typically include a reaction temperature between 204-482° C., for example 315-454° C.; a pressure between 3.5-34.6 Mpa, for example 7.0-20.8 MPa; a feed rate (LHSV) of 0.5 $hr^{-1}$ to 20 $hr^{-1}$ (v/v); and overall hydrogen consumption of 300 to 2000 scf per barrel of liquid hydrocarbon feed (53.4-356 $m^3$ $H_2/m^3$ feed).

Hydroisomerization conditions are dependent in large measure on the feed used and upon the desired product. The hydrogen to feed ratio is typically between 0.089 to 5.34 SCM/liter (standard cubic meters/liter), for example between 0.178 to 3.56 SCM/liter. Generally, hydrogen will be separated from the product and recycled to the reaction zone. Typical feedstocks include light gas oil, heavy gas oils and reduced crudes boiling above about 177° C.

Lube oil may be prepared using the catalyst. For example, a $C_{20+}$ lube oil may be made by hydroisomerizing the paraffin fraction of the feed. Alternatively, the lubricating oil may be made by hydrocracking in a hydrocracking zone a hydrocarbonaceous feedstock to obtain an effluent comprising a hydrocracked oil, and catalytically dewaxing the effluent at a temperature of at least about 200° C. and at a pressure between 0.103 and 20.7 Mpa gauge, in the presence of added hydrogen gas.

Using the catalyst of the present invention, a FT wax feed generated from a GTL process can be hydrocracked to diesel and jet fuels using by contacting the catalyst of the present invention by the process with hydrogen and the catalyst at a temperature in the range of 175-485° C., hydrogen pressures in the range of 5 to 300 bar, and LHSV in the range of 0.1-30 $h^{-1}$.

The following examples will serve to illustrate, but not limit this invention.

Catalyst Preparations

Example 1

Catalyst A

Comparative Hydrocracking Catalyst

A comparative hydrocracking catalyst was prepared per the following procedure: 67 parts by weight silica-alumina powder (obtained from Sasol), 25 parts by weight pseudo boehmite alumina powder (obtained from Sasol), and 8 parts by weight of zeolite Y (from Tosoh) were mixed well. A diluted $HNO_3$ acid aqueous solution (1 wt. %) was added to the mix powder to form an extrudable paste. The paste was extruded in 1/16" asymmetric quadrilobe shape, and dried at 250° F. (121° C.) overnight. The dried extrudates were calcined at 1100° F. (593° C.) for 1 hour with purging excess dry air, and cooled down to room temperature.

Impregnation of Ni and W was done using a solution containing ammonium metatungstate and nickel nitrate in concentrations equal to the target metal loadings of 4 wt. % NiO and 28 wt. % $WO_3$ based on the bulk dry weight of the finished catalyst. The total volume of the solution matched the 103% water pore volume of the base extrudate sample (incipient wetness method). The metal solution was added to the base extrudates gradually while tumbling the extrudates. When the solution addition was completed, the soaked extrudates were aged for 2 hours. Then the extrudates were dried at 250° F. (121° C.) overnight. The dried extrudates were calcined at 842° F. (450° C.) for 1 hour with purging excess dry air, and cooled down to room temperature. This catalyst is named Catalyst A and its physical properties are summarized in Table 3.

Example 2

Catalyst B

Modified Hydrocracking Catalyst

A modified Ni/W hydrocracking catalyst was prepared using extrudates prepared with the same formulation as that for Catalyst A. Impregnation of Ni and W was done using a solution containing ammonium metatungstate and nickel nitrate in concentrations equal to the target metal loadings of 4 wt. % NiO and 28 wt. % $WO_3$ based on the bulk dry weight of the finished catalyst. 2-Hydroxy 1,2,3-propanetricarboxylic (used as a modifying agent), in an amount equal to 10 wt. % of the bulk dry weight of the finished catalyst, was added to the Ni/W solution. The solution was heated to above 120° F. (49° C.) to ensure a completed dissolved (clear) solution. The total volume of the metal solution matched the 103% water pore volume of the base extrudates (incipient wetness method). The metal solution was added to the base extrudates gradually while tumbling the extrudates. When the solution addition was completed, the soaked extrudates were aged for 2 hours. Then the extrudates were dried at 400° F. (205° C.) for 2 hour with purging excess dry air, and cooled down to room temperature.

Example 3

Catalyst C

Modified Hydrocracking Catalyst

Catalyst C was prepared by further calcination of a sampling of Catalyst B at 842° F. (450° C.) for 1 hour.

Example 4

Catalyst D

Modified Hydrocracking Catalyst

Catalyst D was prepared per following procedure: 55 parts silica-alumina powder, 25 parts pseudo boehmite alumina powder, and 20 parts of zeolite Y were mixed well. To the mix, a diluted $HNO_3$ acid (1 wt. %) solution was added to form an extrudable paste. The paste was extruded in 1/16" asymmetric quadrilobe, and dried at 250° F. (121° C.) overnight. The dried extrudates were calcined at 1100° F. (593° C.) for 1 hour with purging excess dry air, and cooled down to room temperature. Impregnation of Ni and W was done using a solution containing ammonium metatungstate and nickel nitrate in concentrations equal to the target metal loadings of 4 wt. % NiO and 28 wt. % $WO_3$ based on the bulk dry weight of the finished catalyst. 2-Hydroxy 1,2,3-propanetricarboxylic (used as a modifying agent), in an amount equal to 10 wt. % of the bulk dry weight of the finished catalyst, was added to the Ni/W solution. The solution was heated to above 120° F. (49° C.) to ensure a clear solution. The total volume of the metal solution matched the 103% water pore volume of the base extrudates (incipient wetness method). The metal solution was added to the base extrudates gradually while tumbling the extrudates. When the solution addition was completed, the soaked extrudates were aged for 2 hours. Then the extrudates were dried at 400° F. (205° C.) for 2 hour with purging excess dry air, and cooled down to room temperature.

Example 5

Catalyst E

Modified Hydrocracking Catalyst

Catalyst E was prepared by further calcination of a sampling of Catalyst D at 842° F. (450° C.) for 1 hour.

Example 6

Catalyst F

Modified Hydrocracking Catalyst

Catalyst F was prepared per following procedure: 69 parts silica-alumina powder and 31 parts pseudo boehmite alumina powder were mixed well. To the mix, a diluted $HNO_3$ acid (1 wt. %) solution was added to form an extrudable paste. The paste was extruded in 1/16" asymmetric quadrilobe, and dried at 250° F. (121° C.) overnight. The dried extrudates were calcined at 1100° F. (593° C.) for 1 hour with purging excess dry air, and cooled down to room temperature. Impregnation of Ni and W was done using a solution containing ammonium metatungstate and nickel nitrate in concentrations equal to the target metal loadings of 4 wt. % NiO and 28 wt. % $WO_3$ based on the bulk dry weight of the finished catalyst. 2-Hydroxy 1,2,3-propanetricarboxylic (used as a modifying agent), in an amount equal to 10 wt. % of the bulk dry weight of the finished catalyst, was added to the Ni/W solution. The solution was heated to above 120° F. (49° C.) to ensure a clear solution. The total volume of the metal solution matched the 103% water pore volume of the base extrudates (incipient wetness method). The metal solution was added to the base extrudates gradually while tumbling the extrudates. When the solution addition was completed, the soaked extrudates were aged for 2 hours. Then the extrudates were dried at 400° F. (205° C.) for 2 hour with purging excess dry air, and cooled down to room temperature.

Example 7

Catalyst G

Modified Hydrocracking Catalyst

Catalyst G was prepared by further calcination of a sampling of Catalyst F at 842° F. (450° C.) for 1 hour.

TABLE 3

| | CATALYST | | | | | | |
| --- | --- | --- | --- | --- | --- | --- | --- |
| | A | B | C | D | E | F | G |
| Base | | | | | | | |
| Zeolite, wt. % | 8 | 8 | 8 | 20 | 20 | 0 | 0 |
| Silica Alumina, wt. % | 67 | 67 | 67 | 55 | 55 | 69 | 69 |
| Alumina, wt. % | 25 | 25 | 25 | 25 | 25 | 31 | 31 |

TABLE 3-continued

| | CATALYST | | | | | | |
|---|---|---|---|---|---|---|---|
| | A | B | C | D | E | F | G |
| Porosity by $N_2$ uptake | | | | | | | |
| Surface area, $m^2/g$ | 413 | 413 | 413 | 451 | 451 | 398 | 398 |
| Mean mesopore diameter, Å | 90 | 90 | 90 | 80 | 80 | 94 | 94 |
| Total pore volume, cc/g | 0.69 | 0.69 | 0.69 | 0.67 | 0.67 | 0.69 | 0.69 |
| Cl test | | | | | | | |
| n-$C_6$ conversion, wt. % | 1.3 | 1.3 | 1.3 | 2.0 | 2.0 | 0.4 | 0.4 |
| i-$C_6$ conversion % | 7.0 | 7.0 | 7.0 | 8.5 | 8.5 | 3.6 | 3.6 |
| Finished Catalysts | | | | | | | |
| Metal content, wt. % | | | | | | | |
| NiO, wt. % | 4 | | 4 | | 4 | | 4 |
| $WO_3$, wt. % | 28 | | 28 | | 28 | | 28 |
| Porosity by $N_2$ uptake | | | | | | | |
| Surface area, $m^2/g$ | 231 | | 243 | | 314 | | 235 |
| Mean mesopore diameter, Å | 89 | | 98 | | 71 | | 112 |
| Micropore pore volume, cc/g | 0.0059 | | 0.0096 | | | | — |
| Total pore volume, cc/g | 0.40 | | 0.42 | | 0.41 | | 0.44 |

Example 8

Hydrocracking Performance

A variety of feeds were used to evaluate the hydrocracking performances of the catalysts. In each test, the catalyst was subjected to the following process conditions for feed 1: 2300 PSIG total pressure (2100 PSIA $H_2$ at the reactor inlet), 5000 SCFB $H_2$, 1.0 LHSV, 60 LV % per pass conversion. For feed 2, the testing conditions were: 1000 psig total pressure (900 psia $H_2$ at the reactor inlet), 5000 scfb $H_2$, 1.0 LHSV, 65 LV % per pass conversion. Table 4 summarizes the physical properties of two feeds used in the tests. Feed 1 is a hydrotreated VGO comprising high concentrations of polycyclic aromatics. Feed 2 is a FT wax generated from a GTL process.

TABLE 4

| | Feed 1 | Feed 2 |
|---|---|---|
| API Gravity | 33.4 | 40.4 |
| Sulfur, ppm wt. | 14.3 | <2 |
| Nitrogen, ppm wt. | 0.5 | 7.9 |
| Oxygen, wt. % | 0 | 0.7 |
| PCI | 333 | — |
| Components | | |
| Paraffins, LV % | 25.5 | 100 |
| Naphthenes, LV % | 66.5 | 0 |
| Aromatics, LV % | 8.0 | 0 |
| ASTM D2887 SimDis, -° F. (° C.) | | |
| 0.5 wt. %/5 wt. % | 771/819 | 437/572 |
| | (381/437) | (225/300) |
| 10 wt. %/30 wt. % | 840/886 | 624/734 |
| | (449/474) | (329/390) |
| 50 wt. %/— | 925/— | 809/— |
| | (496)/— | (432)/— |
| 70 wt. %/90 wt. % | 970/1045 | 898/1002 |
| | (521/563) | (481/539) |
| 95 wt. %/99.5 wt. % | 1087/1213 | 1038/1094 |
| | (586/656) | (559/590) |

Tables 5 and 6 compare the hydrocracking performance over catalysts prepared with and without a modifying agent.

TABLE 5

| Hydrocracking Performance with Feed 1 | | |
|---|---|---|
| Catalyst Activity, ° F. (° C.) No Loss Yields, wt. % | Catalyst A Base | Catalyst C Base |
| $C_4$- | 4.7 | 4.0 |
| $C_5$ - 250° F. (121° C.) | 19.0 | 17.7 |
| $C_5$ - 250-550° F. (121-288° C.) | 54.0 | 53.4 |
| $C_5$ - 550-700° F. (288-371° C.) | 23.7 | 26.1 |

TABLE 6

| Hydrocracking Performance with Feed 2 | | | | |
|---|---|---|---|---|
| Catalyst Activity, ° F. (° C.) No Loss Yields, wt. % | Catalyst A Base | Catalyst B Base +1° F. (+0.55° C.) | Catalyst B* Base -13° F. (-7.2° C.) | Catalyst D Base -16° F. (-8.9° C.) |
| $C_4$- | 1.8 | 1.5 | 1.5 | 1.3 |
| $C_5$-290° F. (143° C.) | 15.4 | 12.7 | 13.4 | 13.4 |
| $C_5$-290-700° F. (143-371° C.) | 82.9 | 85.8 | 85.1 | 85.1 |

*with $NH_3$ scrubbing

Catalyst C shows superior HCR performance over Catalyst A. Catalyst C gave a diesel yield at least 2 wt % higher than base case in expensive of low gas yield ($C_4$—) and naphtha yield ($C_5$-250° F./121° C.). Catalyst C reduced the low gas yield from 4.7 to 4.0 wt % and naphtha yield from 19.0 to 17.7 wt. % in comparison with A. Catalyst C made about 2.5 wt % more heavy diesel (550-700° F./288-371° C.) than Catalyst A with a very comparable jet yield (250-550° F./121-288° C.). The use of 2-hydroxyl-1,2,3-propanetricarboxylic does not affect the catalyst activity.

For Feed 2 (Table 6), both catalysts B and D showed higher diesel yields than Catalyst A by at least 2 wt. % at the expensive of low gas and naphtha, similar to the findings with the petroleum feeds. Also observed was a significant improvement in catalyst activity for Catalyst B and D by more than 10° F. (5.5° C.) as compared to comparative Catalyst A.

Further, the modifying agent enhanced catalytic hydrogenation activity with respect to saturate polycyclic aromatics in the feed. FIG. 1 shows the polycyclic aromatics concentration (measured by polycyclic aromatics index, PCI) in a recycle liquid (e.g. >700° F. (371° C.) fraction) for Feed 1 over Catalysts A and C. Their initial concentration in the feed is also given for comparison. For Catalyst A, FIG. 1 clearly shows that polycyclic aromatics build up in the recycle liquid linearly with time-on-stream over Catalyst A. For Catalyst C, the PCI value in the recycle liquid was much lower than that in the feed and in the recycle liquid with Catalyst A. Also, the PCI value maintained at the same level with time on stream on Catalyst C. This provides direct evidence for the improved hydrogenation activity by the use of modifying agent. It is beneficial for catalyst lifetime as the polycyclic aromatics are considered as precursors of coke formation on catalyst surfaces blocking catalytically active sites inaccessible to reactant molecules.

What is claimed is:

1. A method for hydroprocessing a carbonaceous feedstock, comprising contacting the carbonaceous feedstock with a sulfided hydroprocessing catalyst and hydrogen under hydroprocessing conditions, the hydroprocessing catalyst comprising at least one molecular sieve which is a Y zeolite with a unit cell size of between 24.15 Å and 24.45 Å, and at least one metal deposited on an amorphous silica-alumina catalyst support containing $SiO_2$ in an amount of 10 wt. % to 70 wt. % of the dry bulk weight of the carrier as determined by ICP elemental analysis, a BET surface area of between 450 $m^2/g$ and 550 $m^2/g$, a total pore volume of between 0.75 mL/g and 1.05 mL/g, and a mean mesopore diameter of between 70 Å and 130 Å, wherein deposition of the metal is achieved in the presence of a modifying agent and with the catalyst support after the deposition subjected to drying for a period of time ranging from 1 to 5 hours and at a temperature sufficient to remove impregnation solution solvent but below the decomposition temperature of the modifying agent, wherein the modifying agent is selected from the group consisting of N,N'-bis(2-aminoethyl)-1,2-ethane-diamine, 2-amino-3-(1H-indol-3-yl)-propanoic acid, benzaldehyde, [[(carboxymethyl)imino]bis(ethylenenitrilo)]-tetra-acetic acid, 1,2-cyclohexanediamine, 2-hydroxybenzoic acid, thiocyanate, thiosulfate, thiourea, pyridine, quinolone, and compounds represented by structures (1) through (4), and condensated forms thereof:

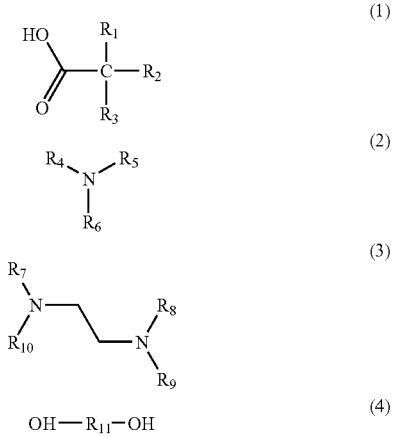

wherein:
(1) $R_1$, $R_2$ and $R_3$ are independently selected from the group consisting of hydrogen; hydroxyl; methyl; amine; and linear or branched, substituted or unsubstituted $C_1$-$C_3$ alkyl groups, $C_1$-$C_3$ alkenyl groups, $C_1$-$C_3$ hydroxyalkyl groups, $C_1$-$C_3$ alkoxyalkyl groups, $C_1$-$C_3$ amino alkyl groups, $C_1$-$C_3$ oxoalkyl groups, $C_1$-$C_3$ carboxyalkyl groups, $C_1$-$C_3$ aminocarboxyalkyl groups and $C_1$-$C_3$ hydroxycarboxyalkyl groups;
(2) $R_4$ through $R_{10}$ are independently selected from the group consisting of hydrogen; hydroxyl; and linear or branched, substituted or unsubstituted $C_2$-$C_3$ carboxyalkyl groups; and
(3) $R_{11}$ is selected from the group consisting of linear or branched, saturated and unsaturated, substituted or unsubstituted $C_1$-$C_3$ alkyl groups, $C_1$-$C_3$ hydroxyalkyl groups, and $C_1$-$C_3$ oxoalkyl groups.

2. The method of claim 1, wherein the at least one molecular sieve is a Y zeolite having a silica-to-alumina ratio of greater than 10, a micropore volume of from 0.15 mL/g to 0.27 mL/g, a BET surface area of from 700 $m^2/g$ to 825 $m^2/g$, and a unit cell size of from 24.15 Å to 24.45 Å.

3. The method of claim 1, wherein the sulfided hydroprocessing catalyst further comprises a Y zeolite having a silica-to-alumina ratio of greater than 10, a micropore volume of from 0.15 mL/g to 0.27 mL/g, a BET surface area of from 700 $m^2/g$ to 825 $m^2/g$, and a unit cell size of from 24.15 Å to 24.35 Å, and a low-acidity, highly dealuminated ultrastable Y zeolite having an Alpha value of less than about 5 and Bronsted acidity of from 1 to 40 micro-mole/g.

4. The method of claim 1, wherein the modifying agent is selected from the group consisting of compounds represented by structures (1) through (4), and condensated forms thereof:

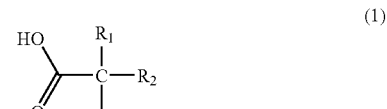

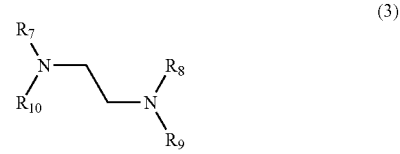

wherein:
(1) $R_1$, $R_2$ and $R_3$ are independently selected from the group consisting of hydrogen; hydroxyl; methyl; amine; and linear or branched, substituted or unsubstituted $C_1$-$C_3$ alkyl groups, $C_1$-$C_3$ alkenyl groups, $C_1$-$C_3$ hydroxyalkyl groups, $C_1$-$C_3$ alkoxyalkyl groups, $C_1$-$C_3$ amino alkyl groups, $C_1$-$C_3$ oxoalkyl groups, $C_1$-$C_3$ carboxyalkyl groups, $C_1$-$C_3$ aminocarboxyalkyl groups and $C_1$-$C_3$ hydroxycarboxyalkyl groups;
(2) $R_4$ through $R_{10}$ are independently selected from the group consisting of hydrogen; hydroxyl; and linear or branched, substituted or unsubstituted $C_2$-$C_3$ carboxyalkyl groups; and
(3) $R_{11}$ is selected from the group consisting of linear or branched, saturated and unsaturated, substituted or unsubstituted $C_1$-$C_3$ alkyl groups, $C_1$-$C_3$ hydroxyalkyl groups, and $C_1$-$C_3$ oxoalkyl groups.

5. The method of claim 1, wherein the modifying agent is selected from the group consisting of N,N'-bis(2-aminoethyl)-1,2-ethane-diamine, 2-amino-3-(1H-indol-3-yl)-propanoic acid, benzaldehyde, [[(carboxymethyl)imino]bis(ethylenenitrilo)]-tetra-acetic acid, 1,2-cyclohexanediamine, 2-hydroxybenzoic acid, thiocyanate, thiosulfate, thiourea, pyridine, and quinolone.

6. The method of claim 1, wherein the modifying agent comprises 2 hydroxyalkyl 1,2,3-propanetricarboxylic.

7. The method of claim 1, wherein the at least one metal is selected from the group consisting of elements from Group 6 and Groups 8 through 10 of the Periodic Table.

8. The method of claim 7, wherein the at least one metal is selected from the group consisting of nickel (Ni), palladium (Pd), platinum (Pt), cobalt (Co), iron (Fe), chromium (Cr), molybdenum (Mo), tungsten (W), and mixtures thereof.

9. The method of claim 7, wherein the at least one metal is at least one metal selected from Group 6 of the Periodic Table and at least one metal selected from Groups 8 through 10 of the periodic table.

10. The method of claim 1, wherein the hydroprocessing conditions comprise a temperature in the range of 175-485° C., hydrogen pressures in the range of 5 to 300 bar, and LHSV in the range of 0.1-30 $h^{-1}$.

11. The method of claim 10, wherein the carbonaceous feedstock is generated from a gas-to-liquid process.

12. The method of claim 1, wherein the hydroprocessing conditions comprise a reaction temperature between 204-482° C., a pressure between 3.5-34.6 Mpa, a feed rate (LHSV) of 0.5 $hr^{-1}$ to 20 $hr^{-1}$ (v/v), and an overall hydrogen consumption of 53.4 to 356 $m^3$ $H_2$ per $m^3$ of liquid hydrocarbon feed.

\* \* \* \* \*